US008456663B2

(12) United States Patent
Kotake

(10) Patent No.: US 8,456,663 B2
(45) Date of Patent: Jun. 4, 2013

(54) COMMUNICATION SYSTEM, AND COMMUNICATION DEVICE AND COMPUTER READABLE MEDIUM FOR THE SAME PROVIDING ERROR-SETTLEMENT STATUS INFORMATION

(75) Inventor: Kanako Kotake, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 492 days.

(21) Appl. No.: 12/731,234

(22) Filed: Mar. 25, 2010

(65) Prior Publication Data
US 2010/0259782 A1 Oct. 14, 2010

(30) Foreign Application Priority Data

Apr. 14, 2009 (JP) ................................. 2009-097873

(51) Int. Cl.
*G06F 3/12* (2006.01)
(52) U.S. Cl.
USPC .......................... 358/1.14; 358/1.13; 358/1.15
(58) Field of Classification Search
USPC ................ 358/1.14, 1.15; 715/705, 708, 709, 715/710, 714, 712, 721, 733, 751, 808
See application file for complete search history.

(56) References Cited

U.S. PATENT DOCUMENTS

| 6,724,494 | B1* | 4/2004 | Danknick ..................... 358/1.14 |
| 6,744,736 | B1 | 6/2004 | Ito |
| 6,989,907 | B1 | 1/2006 | Jeyachandran et al. |
| 7,281,170 | B2* | 10/2007 | Taylor et al. ..................... 714/48 |
| 7,647,534 | B2* | 1/2010 | Castellani et al. .............. 714/46 |
| 7,969,593 | B2 | 6/2011 | Toda |
| 2002/0105671 | A1* | 8/2002 | Sugahara ..................... 358/1.15 |
| 2003/0056140 | A1* | 3/2003 | Taylor et al. ..................... 714/4 |
| 2003/0202202 | A1 | 10/2003 | Miyata |
| 2004/0168109 | A1 | 8/2004 | Ogura |
| 2011/0069340 | A1* | 3/2011 | Asai ............................ 358/1.15 |

FOREIGN PATENT DOCUMENTS

| JP | HEI 05-95355 A | 4/1993 |
| JP | 8-185300 A | 7/1996 |
| JP | 10-24644 | 1/1998 |

(Continued)

OTHER PUBLICATIONS

Notification of Reasons for Rejection dated Mar. 15, 2011 for Japanese Application No. 2009-097873 together with English language translation.

(Continued)

*Primary Examiner* — Dennis Dicker
(74) *Attorney, Agent, or Firm* — Scully, Scott, Murphy & Presser, PC

(57) ABSTRACT

A communication system including a communication device and information display devices connected with the communication device. The communication device includes a status storage unit storing status information representing a status of the communication device, a status transmitter that in response to a status request from each information display device, transmits the stored status information to the information display devices, and an error settlement starting information receiver receiving, from one of the information display devices, error settlement stating information representing that error settlement is being started to fix an error of the communication device. Each information display device includes a display unit displaying an operable image when received status information includes an error status representing the error of the communication device, and an error settlement starting information transmitter that in response to the operable image being operated, transmit the error settlement starting information to the communication device.

6 Claims, 6 Drawing Sheets

FOREIGN PATENT DOCUMENTS

| | | |
|---|---|---|
| JP | HEI 11-20277 A | 1/1999 |
| JP | HEI 11-119601 A | 4/1999 |
| JP | 11-194918 A | 7/1999 |
| JP | HEI 11-205362 A | 7/1999 |
| JP | 2001-43038 | 2/2001 |
| JP | 2001-43054 A | 2/2001 |
| JP | 2002-209035 | 7/2002 |
| JP | 2003-91405 A | 3/2003 |
| JP | 2003091405 A * | 3/2003 |
| JP | 2003-223523 A | 8/2003 |
| JP | 2004-005463 A | 1/2004 |
| JP | 2004-248256 | 9/2004 |
| JP | 2005-45551 A | 2/2005 |
| JP | 2005-236346 | 9/2005 |
| JP | 2006-13814 | 1/2006 |

OTHER PUBLICATIONS

Official Action dated Dec. 7, 2012 from related U.S. Appl. No. 12/731,257.

* cited by examiner

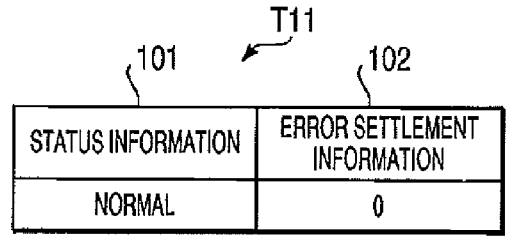
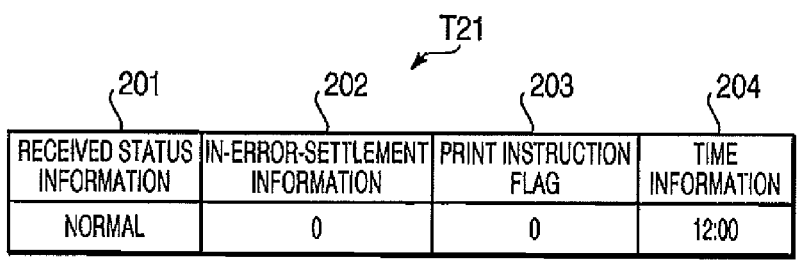

COMMUNICATION SYSTEM, AND COMMUNICATION DEVICE AND COMPUTER READABLE MEDIUM FOR THE SAME PROVIDING ERROR-SETTLEMENT STATUS INFORMATION

CROSS-REFERENCE TO RELATED APPLICATION

This application claims priority under 35 U.S.C. §119 from Japanese Patent Application No. 2009-097873 filed on Apr. 14, 2009. The entire subject matter of the application is incorporated herein by reference.

BACKGROUND

1. Technical Field

The following description relates to one or more techniques for establishing a communication system configured with a plurality of information display devices employing in common a communication device.

2. Related Art

A system has been known, in which a multi-function peripheral (MFP) having multiple functions (e.g., a printer function and a facsimile function) is connected with a plurality of user terminal devices via a LAN, so as to be utilized in common among the user terminal devices. Further, in the system, when an error is caused in the MFP, information on the caused error is transmitted to each of the user terminal devices.

SUMMARY

When an error is caused in the MFP, the error can be settled by any one of users who use in common the MFP. However, since each of the user terminal devices receives information on the caused error, two or more users may come to the MFP in order to fix the error.

Aspects of the present invention are advantageous to provide one or more improved techniques that make it possible to avoid the aforementioned undesirable situation and settle an error in an efficient fashion.

According to aspects of the present invention, a communication system is provided, which includes a communication device, and a plurality of information display devices connected communicably with the communication device. The communication device includes a status storage unit configured to store status information representing a status of the communication device, a status transmitter configured to, in response to receipt of a status request from each of the information display devices, transmit the status information stored on the status storage unit to the information display devices, and an error settlement starting information receiver configured to receive, from one of the information display devices, error settlement stating information representing that error settlement is being started to fix an error caused in the communication device. Each of the information display devices includes a status requestor configured to issue, to the communication device, the status request for transmission of the status information stored on the communication device, a status receiver configured to receive the status information that is transmitted by the communication device in response to the status request issued by the status requestor, a display unit configured to display an operable image when the received status information includes an error status representing the error caused in the communication device, and an error settlement starting information transmitter configured to, in response to the operable image displayed on the display unit being operated, transmit the error settlement starting information to the communication device. In response to the error settlement starting information receiver receiving the error settlement stating information from one of the information display devices, the status storage unit of the communication device stores an in-error-settlement status representing that error settlement is being performed to fix the error represented by the error status. The status transmitter of the communication device transmits the in-error-settlement status stored on the status storage unit to the information display devices. In response to the status receiver receiving the in-error-settlement status from the communication device, the display unit of each information display device displays in-error-settlement information representing that error settlement is being performed to fix the error.

According to aspects of the present invention, further provided is a communication device configured to be connected communicably with a plurality of information display devices. The communication device includes a status storage unit configured to store status information representing a status of the communication device, a status transmitter configured to, in response to receipt of a status request from each of the information display devices, transmit the status information stored on the status storage unit to the information display devices, and an error settlement starting information receiver configured to receive, from one of the information display devices, error settlement stating information representing that error settlement is being started to fix an error caused in the communication device.

According to aspects of the present invention, further provided is a computer readable medium having computer readable instructions stored thereon. When executed by a processor connected communicably with a communication device, the instructions cause the processor to perform a status requesting step of issuing, to the communication device, a status request for transmission of status information stored on the communication device, a status receiving step of receiving the status information that is transmitted by the communication device in response to the status request issued in the status requesting step, a display step of displaying an operable image when the received status information includes an error status representing an error caused in the communication device, and an error settlement starting information transmitting step of, in response to the operable image displayed in the display step being operated, transmitting to the communication device error settlement starting information representing that error settlement is being started to fix the error represented by the error status.

BRIEF DESCRIPTION OF THE ACCOMPANYING DRAWINGS

FIG. 1 schematically shows a configuration of a multi-function peripheral (MFP) system in an embodiment according to one or more aspects of the present invention.

FIGS. 5A to 5C exemplify data stored on an MFP status table in the embodiment according to one or more aspects of the present invention.

FIGS. 6A to 6E exemplify data stored on a PC status table in the embodiment according to one or more aspects of the present invention.

Figure 7A:
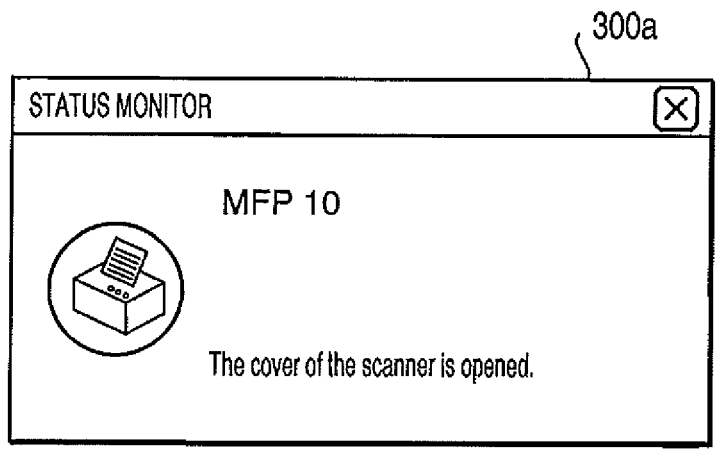
Figure 7B:
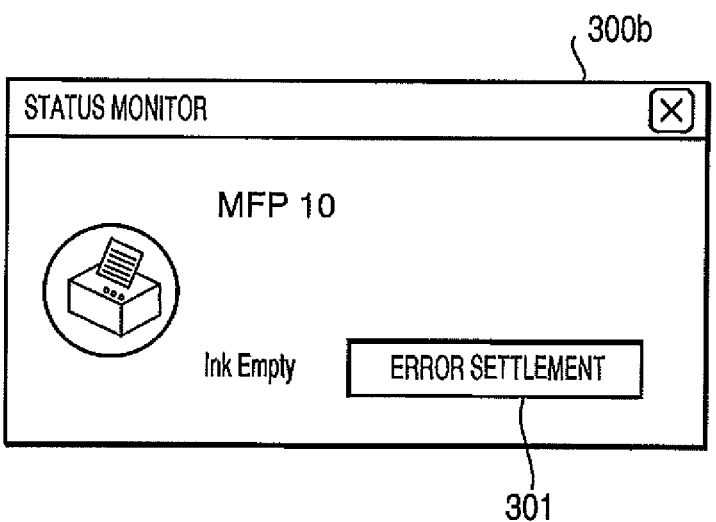
Figure 7C:
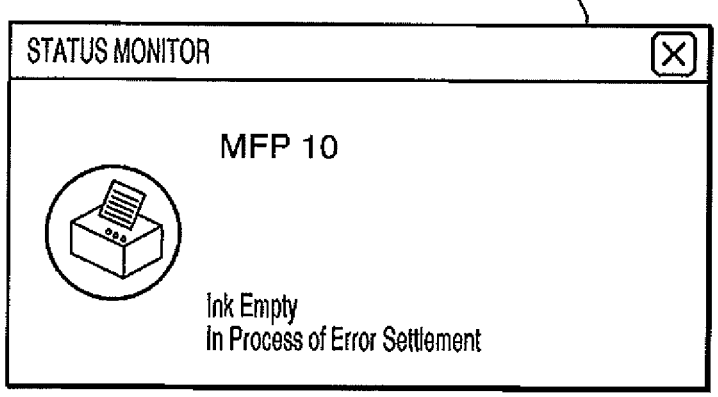

FIGS. 7A to 7C exemplify information displayed in dialog boxes in the embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

Figure 1:
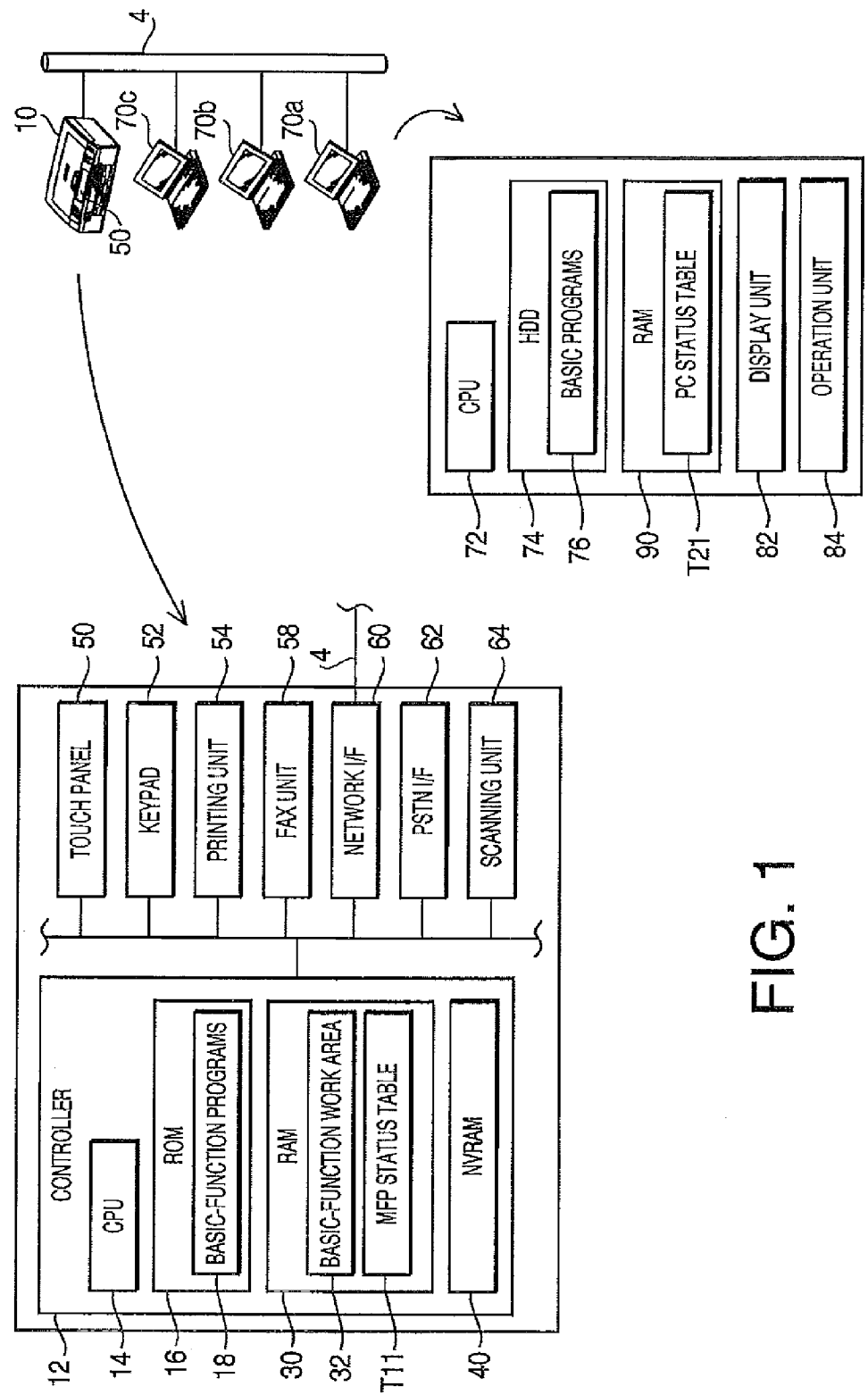

As shown in FIG. 1, a multi-function peripheral (MFP) system 2 of an embodiment includes an MFP 10 and PCs 70a to 70e, which are connected via a LAN 4 communicably with each other.

The MFP 10 includes a controller 12, a touch panel 50, a keypad 52, a printing unit 54, a facsimile unit 58, a network interface (11F) 60, a PSTN interface 62, and a scanning unit 64. The network I/F 60 is linked with the LAN 4. The controller 12 includes a CPU 14, a ROM 16, a RAM 30, and an NVRAM 40.

The CPU 14 performs various processes in accordance with various programs that are stored on the ROM 16 and run on the RAM 30. Basic-function programs 18, stored on the ROM 16, are programs for controlling basic operations of the MFP 10. For example, the basic-function programs 18 contain various control programs for controlling the printing unit 54 and the facsimile unit 58.

Further, the CPU 14 monitors the status of the MFP 10 in real time. As potential statuses of the MFP 10, various statuses are cited such as an error status representing an error state of the MFP 10 and a process status representing progress of a process. In addition, potential error statuses include print-related error statuses of the printing unit 54 and scan-related error statuses of the scanner unit 64. The print-related error statuses represent errors caused in connection with a printing function (e.g., an ink empty error, an out-of-paper error, and a paper jam error).

The RAM 30 is provided with a basic-function work area 32 and a MFP status table T11. The basic-function work area 32 is a storage area to store various kinds of data generated in a process executed in accordance with one of the basic-function programs 18.

As shown in FIGS. 5A to 5C, the MFP status table T11 stores status information 101 and error settlement information 102. The status information 101 represents a status of the MFP 10. In an example shown in FIG. 5B, the MFP status table T11 stores status information 101 representing a print-related error status "Ink Empty." FIGS. 5A to 5C show examples in each of which the MFP status table T11 stores a single piece of status information 101. However, it is noted that the MFP status table T11 may store a plurality of pieces of status information 101. In addition, the error settlement information 102 represents whether the MFP 10 receives error settling information from any of the PCs 70a to 70c. The error settling information denotes that an error of the MFP 10 is currently being settled. For instance, the error settling information is transmitted by a user who is willing to fix the error when beginning to settle the error. Namely, the error settling information shows that any user is settling the error of the MFP 10. Further, a value "0" for the error settlement information 102 indicates that the MFP 10 has not received the error settling information from any PC, i.e, that error settlement for the MFP 10 is not currently in execution.

Subsequently, a configuration of the PC 70a will be described. It is noted that a detailed explanation will be omitted about configurations of the PCs 70b and 70c, which are the same as the configuration of the PC 70a. The PC 70a includes a CPU 72, a hard disk drive (HDD) 74, a display unit 82, an operation unit 84, and a RAM 90. The display unit 82 is configured to display various kinds of information. The operation unit 84 is configured with a keyboard and a mouse. A user can input various kinds of instructions or information by operating the operation unit 84. The HDD 74 has basic programs 76 stored thereon. The basic programs 76 are programs for controlling basic operations of the PC 70a. As an example of the basic programs 76, a status monitor for the MFP 10 is cited. The status monitor is a program adapted to monitor the status of the MFP 10 by regularly inquiring about the status of the MFP 10.

The RAM 90 is provided with a PC status table T21. As exemplified in FIGS. 6A to 6E, the PC status table T21 stores received status information 201, in-error-settlement information 202, a print instruction flag 203, and time information 204. The status information 101 received from the MFP 10 is stored onto the PC status table T21 as the received status information 201. The in-error-settlement information 202 represents whether error settlement for the MFP 10 is being implemented by any user. A value "1" for the in-error-settlement information 202 represents that error settlement for the MFP 10 is being implemented by any user. Meanwhile, a value "0" for the in-error-settlement information 202 represents that error settlement for the MFP 10 is not being implemented by any user.

The print instruction flag 203 is adapted to be set to "1" in response to transmission of a print instruction. The print instruction is a command for instructing the printing unit 54 of the MFP 10 to perform a printing operation. The print instruction is input by the user through the operation unit 84. The MFP 10 performs a printing operation based on the print instruction. The time information 204 denotes a time at which the received status information 201 is updated.

Figure 2:
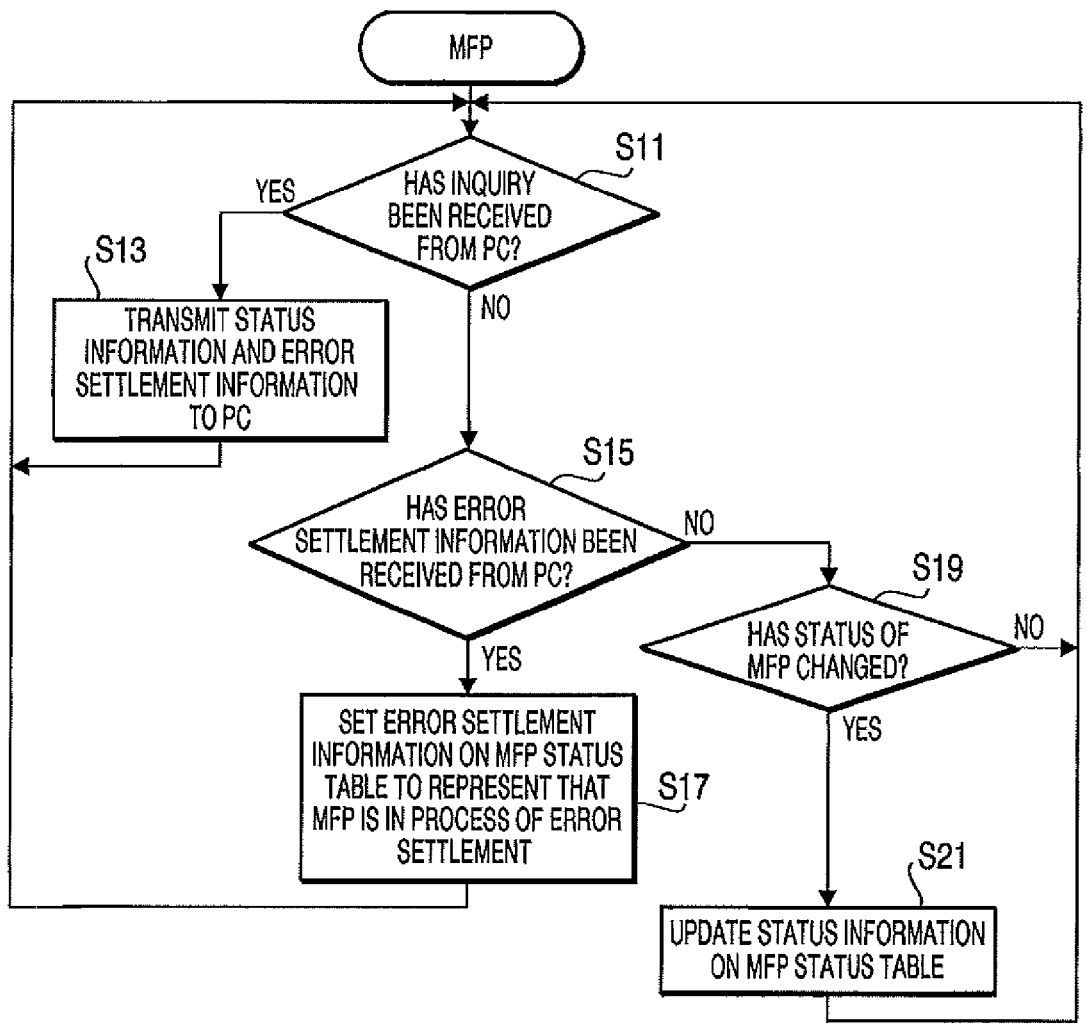
FIG. 2 is a flowchart showing operations of an MFP in the embodiment according to one or more aspects of the present invention.

A main loop process of the MFP 10 will be set forth with reference to FIG. 2. The main loop process is launched when the MFP 10 is powered on, and repeatedly performed until the MFP 10 is powered off. In the main loop process shown in FIG. 2, the MFP 10 stores a change in the status of the MFP 10. Further, when receiving an inquiry about the status of the MFP 10 from a PC, the MFP 10 transmits the status stored therein to the PC. Additionally, the MFP 10 receives the error settlement information 102 from one of the PCs 70a to 70c and stores the error settlement information 102 in the MFP 10. Then, when receiving an inquiry about the status of the MFP 10 from a different one of the PCs 70a to 70c, the MFP 10 transmits the error settlement information 102 stored therein to the PC which has issued the inquiry.

In S11, the CPU 14 determines whether an inquiry about the status information 101 and the error settlement information 102 has been received from any of the PCs 70a to 70c (S11). When determining that any inquiry has not been received (S11: No), the CPU 14 goes to S15.

In S15, the CPU 14 determines whether the error settling information has been received from any of the PCs 70a to 70c (S15). When determining that the error settling information has been received from one of the PCs 70a to 70c (S15: Yes), the CPU 14 goes to S17. In S17, the CPU 14 sets the error settlement information on the MFP status table T11 to "1" (which represents that the error settling information has already been received).

Meanwhile, when determining that the error settling information has not been received from any of the PCs 70a to 70c (S15: No), the CPU 14 goes to S19. In S19, the CPU 14 determines whether the status of the MFP 10 has changed (S19). When determining that the status of the MFP 10 has not changed (S19: No), the CPU 14 goes back to S11. Meanwhile, when determining that the status of the MFP 10 has changed (S19: Yes), the CPU 14 advances to S21.

In S21, the CPU 14 updates the status information 101 on the MFP status table T11 in response to the change in the status of the MFP 10 (S21). For instance, when an error status representing an ink empty state is newly detected, the CPU 14 stores the status information 101 "Ink Empty" onto the MFP status table T11, as shown in FIG. 5B. Then, the CPU 14 goes back to S11.

When determining that an inquiry about the status information 101 and the error settlement information 102 has been received from any of the PCs 70a to 70c (S11: Yes), the CPU 14 goes to S13. In S13, the CPU 14 transmits, to the inquirer PC, the status information 101 and the error settlement information 102 that are stored on the MFP status table T11 (S13).

Figure 3:
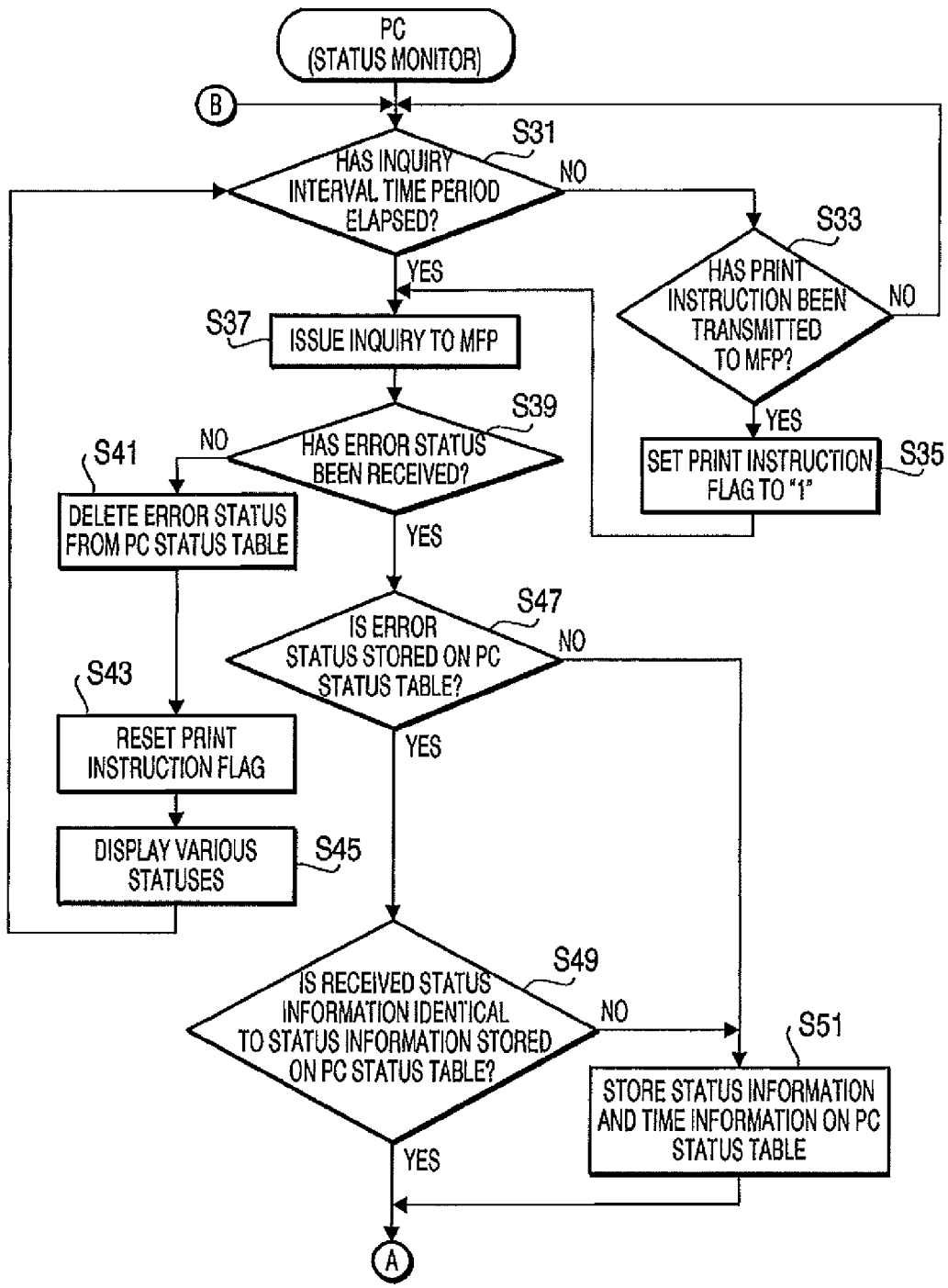
FIGS. 3 and 4 are flowcharts showing operations of a PC in the embodiment according to one or more aspects of the present invention.
Figure 4:
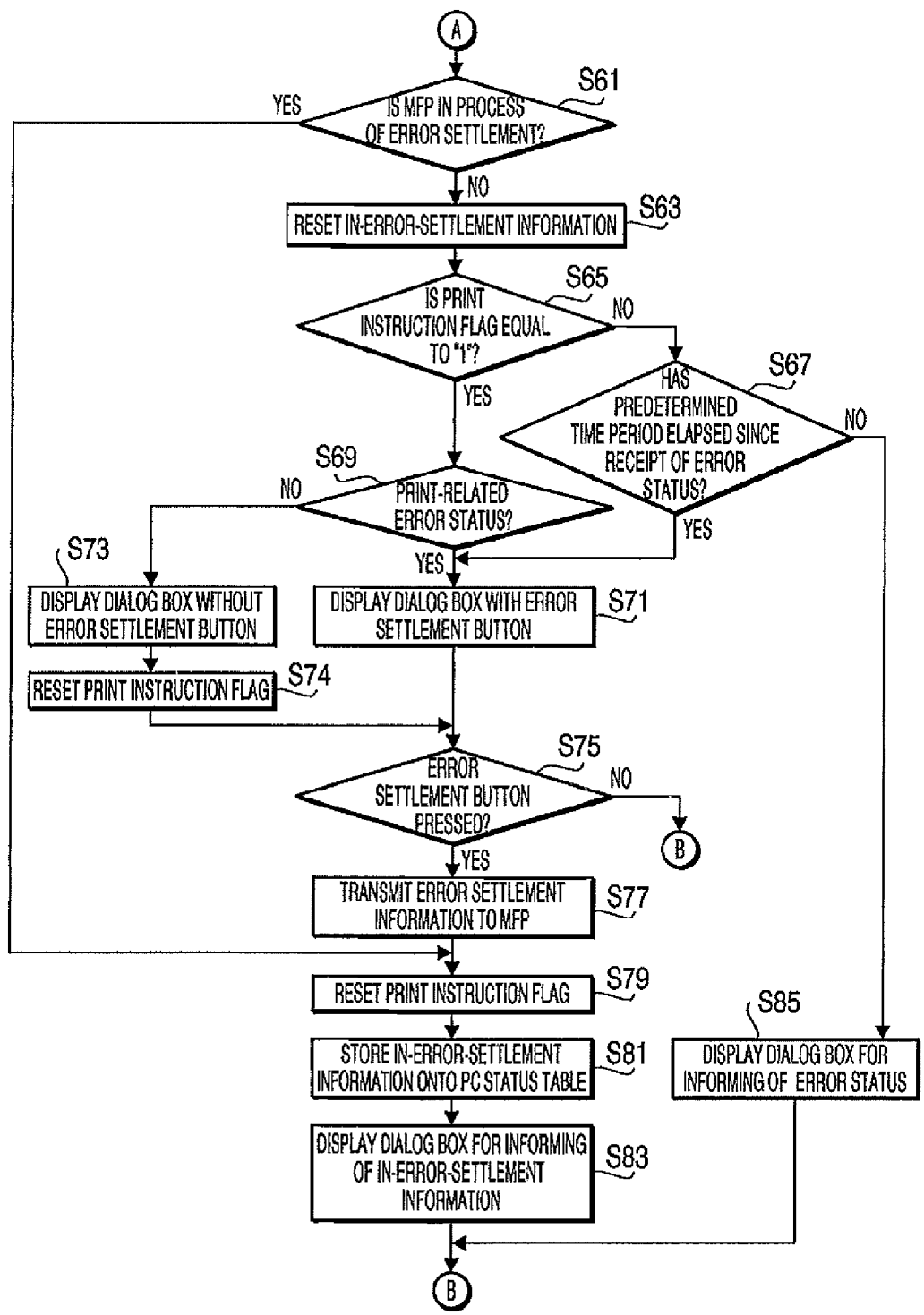

Operations of the PC 70a will be described with reference to FIGS. 3 and 4. It is noted that a detailed explanation will be omitted about operations of the PCs 70b and 70c, which are the same as the operations of the PC 70a.

In S31, the status monitor executed by the PC 70a determines whether an inquiry interval time period has elapsed (S31). The inquiry interval time period may previously be determined by the user. When determining that the inquiry interval time period has elapsed (S31: Yes), the status monitor goes to S37. When determining that the inquiry interval time period has not elapsed (S31: No), the status monitor goes to S33.

In S33, the status monitor determines whether a print instruction has been transmitted by the PC 70a to the MFP 10 (S33). When determining that a print instruction has not been transmitted by the PC 70a to the MFP 10 (S33: No), the status monitor goes back to S31. Meanwhile, when determining that a print instruction has been transmitted by the PC 70a to the MFP 10 (S33: Yes), the status monitor advances to S35. In S35, the status monitor sets the print instruction flag 203 on the PC status table T21 to "1" (S35). Thereafter, the status monitor advances to S37.

In S37, the status monitor issues, to the MFP 10, an inquiry about the status information 101 and the error settlement information 102 (S37). Then, the status monitor receives the status information 101 and the error settlement information 102 that the MFP 10 returns in response to receipt of the inquiry.

In S39, the status monitor determines whether the status information 101 received from the MFP 10 is an error status (S39). When determining that the status information 101 received from the MFP 10 is an error status (S39: Yes), the status monitor goes to S47. In S47, the status monitor determines whether the PC status table T21 stores received status information 201 representing an error status (S47). When determining that the PC status table T21 does not store received status information 201 representing an error status (S47: No), the status monitor goes to S51. Meanwhile, when determining that the PC status table T21 stores received status information 201 representing an error status (S47: Yes), the status monitor goes to S49.

In S49, the status monitor determines whether the status information 101 received this time is identical to the received status information 201 stored on the PC status table T21 (S49). When determining that the status information 101 received this time is identical to the received status information 201 stored on the PC status table T21 (S49: Yes), the status monitor goes to S61 (see FIG. 4). Meanwhile, when determining that the status information 101 received this time is not identical to the received status information 201 stored on the PC status table T21 (S49: No), the status monitor goes to S51.

In S51, the status monitor stores the status information 101 received this time, as the received status information on the PC status table T21 (S51). In addition, in this step, the status monitor stores a time at which the received status information 201 is stored, as the time information 204 on the PC status table T21. Then, the status monitor goes to S61 (see FIG. 4).

In S61, the status monitor determines whether the MFP 10 is in the process of error settlement (S61). Specifically, when the error settlement information 102 transmitted by the MFP 10 is equal to "1," the status monitor determines that the MFP 10 is in the process of error settlement. When determining that the MFP 10 is in the process of error settlement (S61: Yes), the status monitor goes to S63, in which the status monitor resets the in-error-settlement information 202 on the PC status table T21 to "0" (S63). Thereafter, the status monitor goes to S65.

In S65, the status monitor determines whether the print instruction flag 203 on the PC status table T21 is equal to "1" (S65). When determining that the print instruction flag 203 on the PC status table T21 is equal to "1" (S65: Yes), the status monitor goes to S69. This is the case where the status information 101 received this time in S37 is first status information received at or after the time when the print instruction is transmitted to the MFP 10.

In S69, the status monitor determines whether the status information 101 received this time is a print-related error status (S69). As an example of techniques for determining whether the status information 101 received this time is a print-related error status, cited is a technique to examine whether a status, which is identical to the received status information 101, is registered on a list of print-related error statuses which list is stored on the HDD 74.

When determining that the status information 101 received this time is a print-related error status (S69: Yes), the status monitor goes to S71. In S71, the status monitor displays on the display unit 82 a dialog box for informing the user of the print-related error status (S71). Further, the dialog box includes an error settlement button for transmitting the error settling information to the MFP 10. An example of the dialog box displayed in S71 is illustrated in FIG. 7B (see a dialog box 300b). In a dialog box 300b, an error settlement button 301 is displayed along with the error status of the ink empty error. It is noted that the error settlement button 301 may be displayed, e.g., with information "I will fix the error."

A print-related error status, such as the ink empty error and the paper jam error, is caused when the MFP 10 performs a printing operation. Therefore, when a print-related error status has been caused immediately after the print instruction is transmitted, it is deemed that the user who issued the print instruction has caused an error represented by the error status. In the MFP system 2 of the embodiment, the status information 101, which is first received from the MFP 10 at or after the time when the print instruction is transmitted by the PC 70a, is detected using the print instruction flag 203 in S65.

Further, when the detected status information 101 is a print-related error status, the MFP system 2 deems the user of the PC 70a as a person who has caused an error represented by the error status, and displays the dialog box having the error settlement button 301 only on (the display unit 82 of) the PC 70a. Thus, it is possible to increase a possibility to cause the user who has caused the error to fix the error.

Meanwhile, when determining that the status information 101 received this time is not a print-related error status (S69: No), the status monitor goes to S73. In S73, the status monitor displays on the display unit 82 a dialog box for informing the user of an error status other than the print-related error statuses. In this case, the dialog box does not have an error settlement button. An example of the dialog box displayed in S69 is shown in FIG. 7A (see a dialog box 300a). As depicted in FIG. 7A, an error status representing that a cover of a flatbed of the scanning unit 64 remains opened is displayed in the dialog box 300a. In S74, the status monitor resets the print instruction flag 203 to "0" (S74). Thereafter, the status monitor goes to S75.

In S75, the status monitor determines whether the error settlement button 301 has been pressed by the user (S75). For instance, the error settlement button 301 displayed on the display unit 82 may be operated when selected by the mouse. When determining that the error settlement button 301 has not been pressed (S75: No), the status monitor goes back to S31 (see FIG. 3).

Meanwhile, when determining that the error settlement button 301 has been pressed (S75: Yes), the status monitor goes to S77. In S77, the status monitor transmits the error settling information to the MFP 10 (S77).

In S79, the status monitor resets the print instruction flag 203 on the PC status table T21 to "0" (S79). Further, the status monitor goes to S81, in which the status monitor registers the in-error-settlement information 202 of "1" onto the PC status table T21 (S81).

In S83, as exemplified in FIG. 7C, the status monitor displays on the display unit 82 a dialog box for informing the user of the in-error-settlement information (i.e., information that the MFP 10 is in the process of error settlement) (S83).

Meanwhile, when determining that the print instruction flag 203 on the PC status table T21 is not equal to "1" (S65: No), the status monitor goes to S67. In S67, the status monitor determines whether a predetermined time period has elapsed after receiving the status information 101 representing the error status (S67). Specifically, by comparing the time stored as the time information 204 with the current time, the status monitor determines whether an elapsed time period after the time represented by the time information 204 reaches a predetermined time period. It is noted that the predetermined time period may previously be determined by the user. When determining that the predetermined time period has not elapsed after receiving the status information 101 representing the error status (S67: No), the status monitor goes to S85. In S85, the status monitor displays on the display unit 82 a dialog box for informing the user of the error status (S85). Then, the status monitor goes back to S31 (see FIG. 3). Meanwhile, when determining that the predetermined time period has elapsed after receiving the status information 101 representing the error status (S67: Yes), the status monitor goes to S71, in which the status monitor displays on the display unit 82 the dialog box having the error settlement button.

Further, in S39 (see FIG. 3), when determining that the status information 101 received from the MFP 10 is not an error status (S39: Yes), the status monitor goes to S41. This is the case where there is no error caused in the MFP 10. In S41, the status monitor deletes the received status information 201 from the PC status table T21 (S41). Further, in S43, the status monitor resets the print instruction flag 203 to "0" (S43). Then, in S45, the status monitor displays various statuses in dialog boxes on the display unit 82 (S45). As an example of the various statuses, cited is a status representing a progress of a printing operation by the MFP 10. Thereby, in the steps S39 to S45, an operation of displaying in-error-settlement information (i.e., information that error settlement for the MFP 10 is in execution) is terminated in response to the error of the MFP 10 being settled.

Operations of the MFP 10 and the PCs 70a to 70c will be specifically exemplified below. In the following description, it is assumed that the PCs 70a to 70c are connected communicably with the MFP 10, and a print instruction is issued by the PC 70a to the MFP 10. Further, it is assumed that during a printing operation by the MFP 10, an ink empty error is caused in the MFP 10.

When an print instruction is transmitted by the PC 70a to the MFP 10 through a user operation, the status monitor of the PC 70a detects the print instruction transmitted by the PC 70a (S33). The status monitor of the PC 70a sets the print instruction flag 203 on the PC status table T21 to "1" (S35). Thereby, the PC status table T21 of the PC 70a is changed from the state shown in FIG. 6A to the state shown in FIG. 6B.

The MFP 10 performs a printing operation in accordance with the print instruction. Then, when an ink empty error is caused, the CPU 14 detects a change in the status of the MFP 10 (S19). After that, the CPU 14 updates the status information 101 on the MFP status table T11 from "Normal" to "Ink Empty" (S21). Thereby, the MFP status table T11 is changed from the state shown in FIG. 5A to the state shown in FIG. 5B.

Each status monitor of the PCs 70a to 70c transmits to the MFP 10 an inquiry about the status information 101 and the in-error-settlement information 202 (S37), and determines that the status information 100 received from the MFP 10 is the error status "Ink Empty" (S39: Yes). Then, since received status information 201 representing an error status is not stored on the PC status table T21 (S47: No), each status monitor of the PCs 70a to 70c stores the status information 201 received this time as the received status information 201 on the PC status table T21 (S51). Further, each status monitor of the PCs 70a to 70c stores a time (12:01) when the received status information 201 is updated as the time information 204 on the PC status table T21. Thereby, the status table T21 of the PC 70a is changed from the state shown in FIG. 6B to the state shown in FIG. 6C. Additionally, each status table T21 of the PCs 70b and 70c is set with the print instruction flag 203 equal to "0" in the state shown in FIG. 6C.

Further, since the error settlement information 102 received is equal to "0," each status monitor of the PCs 70a to 70c determines that the MFP 10 is not in the process of error settlement (S61: No). Then, each status monitor of the PCs 70a to 70c resets the in-error-settlement information 202 on the PC status table T21 to "0" (S63).

The status monitor of the PC 70a determines that the print instruction flag 203 on the PC status table T21 is "1" (see FIG. 6C, S65: Yes). Then, the status monitor of the PC 70a determines that the status information 101 ("Ink Empty") received this time is a print-related error status (S69: Yes). The status monitor of the PC 70a displays on the display unit 82 the dialog box 300b (see FIG. 7B) with the error settlement button 301 provided therein to inform of the ink empty error (S71). Meanwhile, each status monitor of the PCs 70b and 70c determines that the print instruction flag 203 on the PC status table T21 is "0" (S65: No). Then, since the predetermined time period has not elapsed (S67: No), the status monitor of each of the PCs 70b and 70c displays on the display unit 82 of the corresponding PC (70b or 70c) a dialog box having no error settlement button to inform of the ink empty error (S85). Thereby, the dialog box 300b with the error settlement button 301 provided therein is displayed only on (the display unit 82 of) the PC 70a which has transmitted the print instruction, but not on the PC 70b or 70c which has not transmitted the print instruction.

Hereinafter, an explanation will be provided about the case where the user of the PC 70a presses the error settlement button 301. When determining that the error settlement button 301 has been pressed (S75: Yes), the status monitor of the PC 70a transmits the error settling information to the MFP 10 (S77). Further, the status monitor of the PC 70a resets the print instruction flag 203 to "0" (S79). In addition, the status monitor of the PC 70a stores in-error-settlement information 202 of "1" onto the PC status table T21 (S81). Thereby, the PC status table T21 of the PC 70a is changed from the state shown in FIG. 6C to the state shown in FIG. 6D. The status monitor of the PC 70a displays on the display unit 82 the dialog box 300c (see FIG. 7C) for informing of the in-error-settlement information (S83).

Subsequently, operations of the PCs 70b and 70c will be described. The CPU 14 of the MFP 10 receives the error settling information from the PC 70a (S15: Yes). Then, the CPU 14 sets the error settlement information 102 on the MFP status table T11 to "1" (S17). Thus, the MFP status table T11 is changed from the state shown in FIG. 5B to the state shown in FIG. 5C. When receiving the inquiry from each of the PCs 70b and 70c (S11: Yes), the CPU 14 returns error settlement information of "1" to each PC which has issued the inquiry (S13). Thereby, the PCs 70b and 70c can determine that the MFP 10 is in the process of error settlement (S61: Yes). Each status monitor of the PCs 70b and 70c stores in-error-settlement information of "1" onto the PC status table T21 (S81). Thereby, each PC status table T21 of the PCs 70b and 70c is set to the state shown in FIG. 6D. Then, the status monitor of each of the PCs 70b and 70c displays on the display unit 82 of the corresponding PC (70b or 70c) the dialog box 300c (see FIG. 7C) for informing of the in-error-settlement information (S83). Thereby, it is possible to notify the users of the PCs 70b and 70c that the user of the PC 70a is fixing the error. Thus, it is possible to avoid an undesirable situation where two or more users come together to the MFP 10 for error settlement.

Then, after the user of the PC 70a completely fixes the ink empty error in the MFP 10, the CPU 14 of the MFP 10 detects release of the error status "Ink Empty" of the MFP 10 (S19). Then, the CPU 14 updates the status information 101 on the MFP status table T11 to "Normal," and resets the error settlement information 102 to "0" (S21). Thereby, the MFP status table T11 is changed from the state shown in FIG. 5C to the state shown in FIG. 5A.

Each status monitor of the PCs 70a to 70c issues, to the MFP 10, an inquiry about the status information 101 and the in-error-settlement information 202 (S37), and determines that the status information 101 received from the MFP 10 is "Normal" (S39: No). Therefore, each status monitor of the PCs 70a to 70c updates the received status information 201 on the PC status table T21 to "Normal" (S41), and resets the print instruction flag 203 to "0" (S43). Thereby, each PC status table T21 of the PCs 70a to 70c is changed to the state shown in FIG. 6E. A dialog box for informing that the error is settled and the MFP 10 is in a normal state is displayed on each display unit 82 of the PCs 70a to 70c (S45).

Further, an explanation will be provided about operations in the case where the dialog box 300b with the error settlement button 301 provided therein is displayed only on the PC 70a, and the error settlement button 301 is not pressed (S75: No). When the predetermined time period has elapsed since the time (12:01) represented by the time information 204 without the error settlement button 301 displayed on the display unit 82 of the PC 70a being pressed (S67: Yes), the dialog box 300b (see FIG. 7B) having the error settlement button 301 is also displayed on each display unit 82 of the PCs 70b and 70c (S71). Then, when the error settlement button 301 is pressed at the side of the PC 70b or 70c (S75: Yes), the status monitor of the PC 70b or 70c transmits the error settling information to the MFP 10 (S77). Since the following operations are the same as those of the PC 70a, a detailed explanation about them will be omitted.

Thus, the error settlement button 301 is displayed only on (the display unit 82 of) the PC 70a which ahs transmitted the print instruction causing the error. However, when the error settlement button 301 is not pressed even after the predetermined time period has elapsed, the error settlement button 301 is displayed on each display unit 82 of the PCs 70b and 70c. Thereby, it is possible to prompt each user of the PCs 70b and 70c to fix the error.

As described above, when an error is caused in the MFP 10, the status information 101 representing an error status is transmitted to each of the PCs 70a to 70c, and information that the error is caused is displayed on each display unit 82 of the PCs 70a to 70c. Then, when the error settlement button is pressed at the side of one of the PCs 70a to 70c, the information that error settlement for the MFP 10 is in execution is conveyed to the other PCs via the MFP 10. In response to completion of the error settlement for the MFP 10 being detected at the MFP 10 side, an operation of displaying on each display unit 82 of the PCs 70a to 70c the information that error settlement for the MFP 10 is in execution is terminated, all users are notified of the completion of the error settlement (i.e., that the error is fixed). Thereby, when any user begins to fix the error, it is possible to inform the other users of it. Thus, it is possible to avoid an undesirable situation where two or more users come together to the MFP 10 for error settlement.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

When it is determined in S33 that a print instruction has not been transmitted to the MFP 10 (S33: No), the status monitor of each PC may go to a step of determining whether a printing operation executed by the MFP 10 in accordance with a print instruction has completely been performed. When determining that the printing operation has completely been performed, the status monitor of each PC may reset the print instruction flag 203 to "0" and go back to S31. Meanwhile, when determining that the printing operation has not completely been performed, the status monitor of each PC may directly go back to S31. Thereby, it is possible to identify, based on the print instruction flag 203, a time period until a printing operation is completely performed after a print instruction is issued.

Further, for instance, the status monitor of each PC may set the print instruction flag 203 to "1" in S35, and thereafter go back to S31 to wait until the inquiry interval time period has elapsed.

In the aforementioned embodiment, the dialog box with the error settlement button 301 provided therein is displayed only on a PC which has transmitted a print instruction. However, the dialog box having the error settlement button 301 may be displayed on all PCs connected with the MFP 10. In such a configuration, when any user begins to fix an error caused in the MFP 10, it is possible to inform the other users of it. Thus, it is possible to avoid an undesirable situation where two or more users come together to the MFP 10 for error settlement.

In the aforementioned embodiment, aspects of the present invention are applied to the example case of fixing a print-related error. However, aspects of the present invention may be applied to a case of fixing any error concerning the functions of the MFP 10 such as a facsimile-related error and a scanner-related error.

In the aforementioned embodiment, as illustrated in FIG. 7B, the error settlement button 301 is a push button. However, the error settlement button 301 may be a radio button configured to be selected from a plurality of options. Alternatively, the error settlement button 301 may be a check box configured to, when selected, be shown with a check mark.

What is claimed is:

1. A communication system comprising:
a communication device; and
a plurality of information display devices connected communicably with the communication device,
wherein the communication device comprises:
    a status storage unit configured to store status information representing a status of the communication device;
    a status transmitter configured to, in response to receipt of a status request from each of the information display devices, transmit the status information stored on the status storage unit to the information display devices; and
    an error settlement starting information receiver configured to receive, from one of the information display devices, error settlement starting information representing that error settlement is being started to fix an error caused in the communication device,
wherein each of the information display devices comprises:
    a status requestor configured to issue, to the communication device, the status request for transmission of the status information stored on the communication device;
    a status receiver configured to receive the status information that is transmitted by the communication device in response to the status request issued by the status requestor;
    a display unit configured to display an operable image when the received status information includes an error status representing the error caused in the communication device; and
    an error settlement starting information transmitter configured to, in response to the operable image displayed on the display unit being operated, transmit the error settlement starting information to the communication device,
wherein in response to the error settlement starting information receiver receiving the error settlement starting information from one of the information display devices, the status storage unit of the communication device stores an in-error-settlement status representing that error settlement is being performed to fix the error represented by the error status,
wherein the status transmitter of the communication device transmits the in-error-settlement status stored on the status storage unit to the information display devices, and
wherein in response to the status receiver receiving the in-error-settlement status from the communication device, the display unit of each information display device displays in-error-settlement information representing that error settlement is being performed to fix the error;
wherein the communication device further comprises a printing unit configured to perform a printing operation,
wherein each of the information display devices further comprises a print instructor configured to issue, to the communication device, a print instruction to cause the printing unit to perform a printing operation,
wherein the display device of each information display device is configured to display the operable image when status information, which is transmitted by the communication device in response to a status request issued at or after a time when the print instructor issues the print instruction, includes a print-related error status representing an error caused in the printing unit,
wherein each of the information display devices further comprises a monitor configured to monitor whether the status receiver receives the in-error-settlement status until a predetermined time period elapses after receipt of the print-related error status, and
wherein the display device of each information display device is configured to display the operable image when the monitor determines that the status receiver receives no in-error-settlement status until the predetermined time period elapses after receipt of the print-related error status.

2. The communication system according to claim 1, wherein when status information, which is transmitted by the communication device in response to a status request issued after the display unit displays the in-error-settlement information, includes no error status, the display unit stops displaying the in-error-settlement information.

3. A communication device configured to be connected communicably with a plurality of information display devices, comprising:
a status storage unit configured to store status information representing a status of the communication device;
a status transmitter configured to, in response to receipt of a status request from each of the information display devices, transmit the status information stored on the status storage unit to the information display devices; and
an error settlement starting information receiver configured to receive, from one of the information display devices, error settlement starting information representing that error settlement is being started to fix an error caused in the communication device.

4. A computer readable storage device having computer readable instructions stored thereon, the instructions, when executed by a processor connected communicably with a communication device, causing the processor to perform:

a status requesting step of issuing, to the communication device, a status request for transmission of status information stored on the communication device;

a status receiving step of receiving the status information that is transmitted by the communication device in response to the status request issued in the status requesting step;

a display step of displaying an operable image when the received status information includes an error status representing an error caused in the communication device; and an error settlement starting information transmitting step of, in response to the operable image displayed in the display step being operated, transmitting to the communication device error settlement starting information representing that error settlement is being started to fix the error represented by the error status wherein the communication device further comprises a printing unit configured to perform a printing operation, wherein the instructions cause the processor to further perform:

a step of issuing, to the communication device, a print instruction to cause the printing unit to perform a printing operation;

a step of displaying the operable image when status information, which is transmitted by the communication device in response to a status request issued at or after a time when the print instruction is issued, includes a print-related error status representing an error caused in the printing unit, a monitoring step of monitoring whether the in-error-settlement status is received until a predetermined time period elapses after receipt of the print-related error status; and a step of displaying the operable image when it is determined in the monitoring step that no in-error-settlement status is received until the predetermined time period elapses after receipt of the print-related error status.

5. The computer readable storage device according to claim 4, wherein the instructions cause the processor to further perform a step of, in response to receipt of an in-error-settlement status representing that error settlement is being performed to fix the error caused in the communication device from the communication device, displaying in-error-settlement information representing that error settlement is being performed to fix the error.

6. The computer readable storage device according to claim 5, wherein the instructions cause the processor to further perform a step of, when status information, which is transmitted by the communication device in response to a status request issued after the in-error-settlement information is displayed, includes no error status, stopping displaying the in-error-settlement information.

\* \* \* \* \*